(12) United States Patent
Linford et al.

(10) Patent No.: US 8,147,985 B2
(45) Date of Patent: Apr. 3, 2012

(54) DIAMOND COATING BY LIVING POLYMERIZATION

(76) Inventors: Matthew R. Linford, Orem, UT (US); Li Yang, Provo, UT (US); Landon Wiest, Provo, UT (US)

( * ) Notice: Subject to any disclaimer, the term of this patent is extended or adjusted under 35 U.S.C. 154(b) by 0 days.

(21) Appl. No.: 12/463,414

(22) Filed: May 10, 2009

(65) Prior Publication Data

US 2010/0234560 A1    Sep. 16, 2010

Related U.S. Application Data

(60) Provisional application No. 61/052,182, filed on May 10, 2008.

(51) Int. Cl.
  *B32B 9/04* (2006.01)
  *C08K 9/04* (2006.01)
  *C01B 31/06* (2006.01)

(52) U.S. Cl. ........ 428/688; 428/413; 428/523; 526/135; 526/147; 526/346; 528/405

(58) Field of Classification Search ................. 523/215; 428/688, 413, 523; 423/446; 526/135, 147, 526/346; 528/405
See application file for complete search history.

(56) References Cited

U.S. PATENT DOCUMENTS 7,276,283 B2 * 10/2007 Denes et al. ............. 428/403
2008/0249229 A1 * 10/2008 Lukehart et al. ......... 524/496

OTHER PUBLICATIONS

Li et al, Surface functionalization of nanodiamond particles via atom transfer radical polymerization, Carbon, 44 (2006) 2308-2315.*
Qin et al, Functionalization of Single-Walled Carbon Nanotubes with Polystyrene via Grafting to and Grafting from Methods, Macromolecules, 2004, 37, 752-757.*
Qin et al, Polymer Brushes on Single-Walled Carbon Nanotubes by Atom Transfer Radical Polymerization of n-Butyl Methacrylate, J. Am. Chem. Soc., 2004, 126, 170-176.*

* cited by examiner

*Primary Examiner* — Fred M Teskin
(74) *Attorney, Agent, or Firm* — James Sonntag

(57) ABSTRACT

A method for coating a diamond where an initiation site is provided on the diamond surface or initiation of a living polymerization on the site and the initiation site is reacted with a monomer having a site the reacts with and bonds to the initiation site to form an chemically attached chain with a new initiation site on the chain for further reaction with a monomer. An article with a coating upon a diamond surface, the coating the reaction product of a living polymerization reaction with initiation site on the diamond surface.

20 Claims, 13 Drawing Sheets

DIAMOND COATING BY LIVING POLYMERIZATION

CROSS REFERENCE TO RELATED APPLICATIONS

Priority is claimed from U.S. Provisional Patent Application 61/052,182, filed 10 May 2008, which is hereby incorporated by reference

BACKGROUND OF INVENTION

The present disclosure relates to coating diamond surfaces.

SUMMARY OF INVENTION

An aspect is a method for coating a diamond where an initiation site is provided on the diamond surface for initiation of a living polymerization on the site. The initiation site is reacted with a monomer having a site that reacts with and bonds to the initiation site to form a chemically attached chain with a new initiation site on the chain for further reaction with a monomer. An article with a coating upon a diamond surface can be made where the coating is the reaction product of a living polymerization reaction with initiation site on the diamond surface.

DETAILED DESCRIPTION

Figure 1:
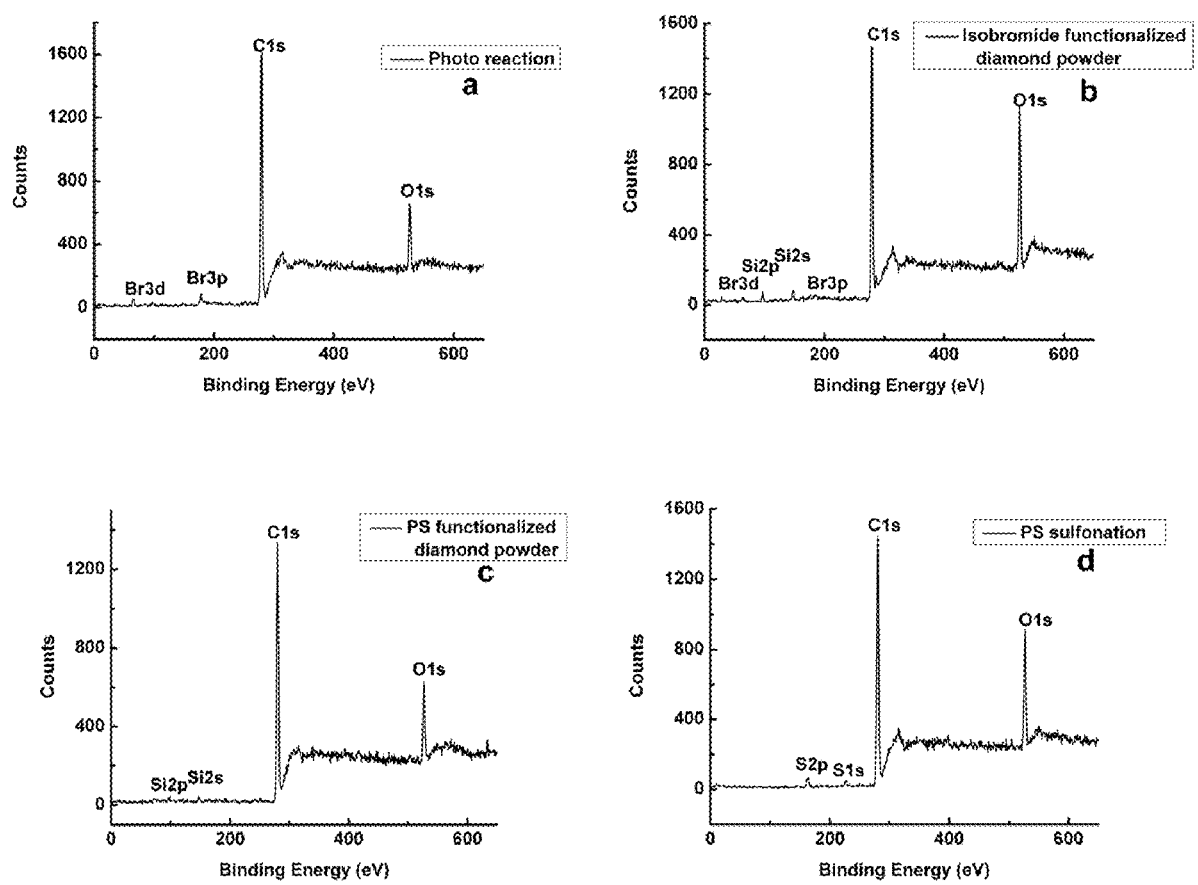
FIG. 1 shows X-ray photoelectron spectroscopy (XPS) for diamond powders: a) hydrogen-terminated diamond reacted with bromine under light, b) piranha treated diamond reacted with isobromide, c) brominated diamond functionalized with polystyrene by ATRP and d) sulfonated polystyrene diamond powder.

Living polymerization involves first providing an initiator, or an initial reactive site, which then reacts with a monomer. The monomer extends as a chain from the reactive site, and a new reactive site forms on the end of the chain and the reaction is repeated with new monomer molecule. In the process of the present invention, the initiator/reactive site is provided on the diamond surface. Accordingly, as the chain forms, it extends from the diamond surface.

As is further described below, the initiating reactive sites on the diamond surface may include, but are not limited to, —H, —OH, halogen (e.g. Cl or Br), and carbon-carbon double bond for ring opening metathesis polymerization (ROMP)

The reactive site may be bonded directly to the diamond surface. For example, diamond usually has —OH radicals attached to the surface, and can be used as is. Alternately, —H sites can be applied by reaction of the surface with hydrogen. Halogens can be applied by reaction of —H sites with halogen under suitable conditions. A surface with halogen sites can be treated with a strong base to convert same to hydroxyl —OH sites. Hydroxyl sites can be treated with a strong base such as NaH, $NaNH_2$ or NaC≡CH, sodium methoxide, alkyl lithium or Grignard reagent to provide an —O$^-$, which can used to as in initiator in a ring-opening reaction to attach epoxide, and the like. The surface of diamond can be treated so that it will contain carbon-carbon double bonds.

The reaction sites may also be indirectly bonded. For example, a molecule with an initiating active group can be bonded directly to the bonded surface, such surface with hydroxyl groups (—OH) can be treated with a compound like 2-bromoisobutyryl bromide to provide a reactive bromine for initiating ATRP.

Living polymerization systems are characterized by a rate of chain initiation that is fast compared with the rate of chain propagation, so that the number of kinetic-chain carriers is essentially constant throughout the polymerization. Living polymerization can also be described as a chain growth process without irreversible chain breaking reactions (transfer and termination). Such a polymerization provides endgroup control. Side reactions can occur but only to an extent which does not considerably disturb the control of the molecular structure of the polymer chain. Examples of living polymerization include cationic, ring-opening metathesis, group transfer, and radical polymerizations.

Characteristics of living polymerization may include, slow initiation, reversible formation of species with various activities and lifetimes, reversible formation of inactive (dormant) species (reversible deactivation), and reversible transfer (in some cases). Living polymerization does not involve irreversible deactivation (i.e., termination), or irreversible transfer.

Reversible termination or reversible deactivation is a process where active species are in a dynamic equilibrium with inactive (dormant) species. Examples include cationic, group transfer, and radical polymerizations where the dormant species (P) are covalent and the active ones (P*) can be ions, ion pairs, or radicals. A catalyst, co-initiator, or/activator may by used in reaction of the active species, which becomes a deactivator or product of the activation process. Reversible transfer can be a bimolecular reaction between a dormant and an active polymer chain which only differ in their degree of polymerization or a reaction with a low molecular compound with a structure similar to the chain end, e.g. addition of alcohols in the anionic ring-opening polymerization of epoxides Since in living polymerization the ability of a growing polymer chain to terminate has essentially been removed, chain transfer reactions are absent or insignificant. The rate of chain initiation is also much larger than the rate of chain propagation. The result is that the polymer chains grow at a more constant rate than seen in traditional chain polymerization and their lengths remain very similar.

Living polymerization for production of polymers is described in Macromolecular Nomenclature Note No. 12, NAMING OF CONTROLLED, LIVING AND "LIVING" POLYMERIZATIONS, Krzysztof Matyjaszewski and Axel H. E. Müller, at http://www.polyacs.org/nomcl/mnn12.html; Living Ziegler-Natta Polymerization, Richard J. Keaton, Department of Chemistry and Biochemistry, University of Maryland, at http://organicdivision.org/essays 2002/keaton.pdf, and "Living Polymers"—50 years of evolution, Moshe Levy, Department of Materials and Interfaces, Weizmann Institute of Science, Rehovot at http://www.weizmann.ac.il/ICS/booklet/18/pdf/levy.pdf.

Living polymerization as applied to the present process involves creating a living polymerization initiating or active site on a diamond surface, and reacting this site with an appropriate monomer. Thus, a polymer chain is grown on the surface from the original reactive site on the surface. The monomer is chosen to impart to the diamond surface a selected property. For example, a monomer with aromatic groups, primary, secondary, tertiary, or quaternary amine groups, carboxyl groups, hydroxyl groups, sulfonic acid groups, cyano groups, alkyl chains, or any other suitable chemistry.

The initiator/reactive site can be attached to the diamond surface by conventional chemical bonding techniques. The choice of initiator/reactive site and monomer or monomers depends on the living polymer system that is being used. The monomer also depends on the surface properties that are to be imparted to the diamond by the coating. For example, the monomer may have chemistry or reactive sites that impart a desired property, or sites that can be further reacted to impart the property, for example, aromatic groups, hydroxyl, carboxyl, amine, aromatic groups, primary, secondary, tertiary, or quaternary amine groups, carboxyl groups, hydroxyl groups, sulfonic acid groups, cyano groups, alkyl chains, or any other suitable chemistry. For example, a monomer with an aromatic group will provide a surface with sites for conversion to an anionic surface (e.g. by sulfonation) for separations. Such aromatic groups could also undergo alkylation or acylation. The monomer should not be reactive in a way that would materially interfere with the living polymerization.

Living polymerization techniques that may be used in the present process include free radical living polymerization, living cationic polymerization, ring opening metathesis polymerization, group transfer polymerization, anionic living polymerization, living Ziegler-Natta polymerization, and free radical living polymerization.

Free Radical Living Polymerization

Free radical living polymerization involve catalytic chain transfer polymerization, iniferter mediated polymerization, stable free radical mediated polymerization (SFRP), atom transfer radical polymerization (ATRP), reversible addition-fragmentation chain transfer (RAFT) polymerization, and iodine-transfer polymerization. Other examples include Stable free radical mediated polymerization (SFRP) (also called nitroxide mediated polymerization (NMP)), Free Radical—Atom Transfer Radical Polymerization (ATRP)

Atom transfer radical polymerization (ATRP) involves the chain initiation of free radical polymerization by a halogenated organic species in the presence of a metal halide species. The metal has a number of different oxidation states that allows it to abstract a halide from the organohalide, creating a radical that then starts free radical polymerization. After initiation and propagation, the radical on the chain active chain terminus is reversibly terminated (with the halide) by reacting with the catalyst in its higher oxidation state. Thus, the redox process gives rise to an equilibrium between dormant (Polymer-Halide) and active (Polymer-radical) chains. The equilibrium is designed to heavily favor the dormant state, which effectively reduces the radical concentration to sufficiently low levels to limit bimolecular coupling. ATRP is disclosed in U.S. Pat. No. 5,763,548, issued to Matyjaszewski, et al on Jun. 9, 1998, which is hereby incorporated by reference.

ATRP and other free radical methods are used to provide the diamond coating by first creating a free radical active site on the diamond surface. For ATRP this is accomplished by applying a halogen to the surface of the diamond. The metal abstracts the halide from the diamond surface, creating a free radical reactive site that starts free radical polymerization with a monomer.

Free Radical—Reversible Addition Fragmentation Chain Transfer (RAFT)

Reversible Addition Fragmentation chain Transfer (RAFT) polymerization is a degenerative chain transfer process and is free radical in nature. Most RAFT agents contain thiocarbonyl-thio groups, and it is the reaction of polymeric and other radicals with the C=S that leads to the formation of stabilized radical intermediates. In an ideal system, these stabilized radical intermediates do not undergo termination reactions, but instead reintroduce a radical capable of reinitiation or propagation with monomer, while they themselves reform their C=S bond. The cycle of addition to the C=S bond, followed by fragmentation of a radical, continues until all monomer is consumed. Termination is limited in this system by the low concentration of active radicals.

Free Radical—Iodine-Transfer Polymerization

Iodine-transfer polymerization, typically uses a mono- or diiodo-perfluoroalkane as the initial chain transfer agent. This fluoroalkane may be partially substituted with hydrogen or chlorine. The energy of the iodine-perfluoroalkane bond is low and, in contrast to iodo-hydrocarbon bonds, its polarization small. Therefore, the iodine is easily abstracted in the presence of free radicals. Upon encountering an iodoperfluoroalkane, a growing poly(fluoroolefin) chain will abstract the iodine and terminate, leaving the now-created perfluoroalkyl radical to add further monomer. But the iodine-terminated poly(fluoroolefin) itself acts as a chain transfer agent. As in RAFT processes, as long as the rate of initiation is kept low, the net result is the formation of a monodisperse molecular weight distribution. (See "Living Polymers by the use of Trithiocarbonates as Reversible Addition—Fragmentation Chain Transfer (RAFT) Agents: ABA Triblock Copolymers by Radical Polymerization in Two Step" by Roshan T. A. Mayadunne, et al., CSIRO Molecular Science, Bag 10, Clayton South, Victoria 3169 Australia. Macromolecules 2000, 33, 243-245.)

Free Radical—Selenium-Centered Radical-Mediated Polymerization

Diphenyl diselenide and several benzylic selenides have been explored as photoiniferters in polymerization of styrene and methyl methacrylate. Their mechanism of control over polymerization is proposed to be similar to the dithiuram disulfide iniferters. However, their low transfer constants allow them to be used for block copolymer synthesis but give limited control over the molecular weight distribution.

Free Radical—Telluride-Mediated Polymerization (TERP)

Telluride-Mediated Polymerization or TERP appears to mainly operate under a reversible chain transfer mechanism by homolytic substitution under thermal initiation. Alkyl tellurides of the structure Z—X—R, were Z=methyl and R=a good free radical leaving group, give the better control for a wide range of monomers, phenyl tellurides (Z=phenyl) giving poor control. Polymerization of methyl methacrylates are only controlled by ditellurides. The importance of X to chain transfer increases in the series O<S<Se<Te, makes alkyl tellurides effective in mediating control under thermally initiated conditions and the alkyl selenides and sulfides effective only under photoinitiated polymerization.

Free Radical—Stibine-Mediated Polymerization

Stibine-mediated polymerization uses an organostibine transfer agent with the general structure Z(Z')—Sb—R (where Z=activating group and R=free radical leaving group). A wide range of monomers (styrenics, (meth)acrylics and vinylics) can be controlled, giving narrow molecular weight distributions and predictable molecular weights under thermally initiated conditions. Bismuth alkyls can also control radical polymerizations via a similar mechanism.

Ring Opening Metathesis Polymerization

Ring opening metathesis polymerization (ROMP) is a polymerization method in which (generally strained) cyclic olefins (e.g. norbornene or cyclopentene) are polymerised with a metathesis catalyst. As used in the present system, a diamond surface is first provided with olefin, cyclic olefin, or —C≡C sites, that by means of a metatheses catalyst can be opened and attached to a cyclic olefin monomer.

Group Transfer Polymerization (GTP)

Group transfer polymerization is disclosed in U.S. Pat. No. 4,940,760, which is hereby incorporated by reference. Group Transfer Polymerization (GTP) is a process for preparing a "living" polymer. The process involves contacting under polymerizing conditions in a polymerization medium at least one acrylic or maleimide monomer with an initiator, which is a tetracoordinate organosilicon, organotin or organogermanium compound having at least one GTP initiating site, and a catalyst which is an anion or is a source of an anion, which is selected from the group consisting of bifluoride, fluoride, cyanide, azide or a selected oxyanion, or a selected Lewis acid or Lewis base. The initiator or the anion or Lewis acid catalyst is chemically attached (grafted) to a solid support that is insoluble in the polymerization medium.

GTP is applied in the present process for coating diamonds by bonding on the surface of the diamond the initiator or the anion or Lewis acid catalyst, which provides the initiating site, and treating with acrylic or maleimide monomer.

Anionic Living Polymerization

Anionic living polymerization is a vinyl polymerization and involves polymerization of monomers containing double bonds. Anionic living polymerization begins with an initiator which forms an ion. In the present process, the initiator can be attached to the diamond surface, which can be an alkyl chain with a pendant lithium. The initiator is involved in an equilibrium where lithium ions and carbanions are formed. The carbanion pendant end then reacts with a double bond in a monomer, which lengthens the chain and forms a new carbanion at the end of the chain.

Living Ziegler-Natta Polymerization

Ziegler-Natta polymerizations are described in "Living Ziegler-Natta Polymerization" by Richard J. Keaton, cited above. Ziegler-Natta polymerization is a type of coordination polymerization in which the catalytically active species in solution are believed to be metal alkyl cations. Generation of these active centers stems from the reaction of a metal dialkyl with a borane ($B(C_6F_5)_3$), a borate ($[Ph_3C][B(C_6F_5)_4]$), or an alkyl aluminum, the most common of which is methylaluminoxane. After partial or complete abstraction of one alkyl group, a cationic metal center is formed with a coordinative site of unsaturation. The mechanism by which chain growth occurs for Ziegler-Natta polymerizations is called the Cossee-Arlman mechanism. Monomer coordination to the cationic metal causes insertion of the polymer chain to the π-coordinated olefin. This chain elongation goes through a metallocyclobutane transition state with the olefin insertion occurring with cis addition across the double bond. The migratory insertion step provides a new vacant site for a new molecule of monomer to bind, and this subsequently inserts providing the original vacant site.

Epoxide Ring Opening Reactions

Living anionic polymerizations or copolymerizations of various monomers, including epoxide and cyclic ester monomers, can be accomplished by creating —O⁻ sites on the diamond surface. These sites can be introduced in different ways. The first is to take advantage of the —OH groups that are often formed at the surfaces of diamond materials when they are created, removing the hydrogen ions from these hydroxyl moieties. The second is to introduce —OH groups at the diamond surface, or on a group that has been grafted into the diamond surface. This could be done by hydrogen (or deuterium) terminating a diamond surface, halogenating it, and then allowing this surface to react with hydroxide ions (OH⁻). The hydrogen ions can be removed from —OH groups at or near the diamond surface by reaction with a strong base such as an alkyl lithium reagent, an alkyl Grignard reagent, sodium amide ($NaNH_2$), sodium hydride, potassium hydride, or sodium acetylide. The resulting deprotonated diamond surfaces could then be rinsed with a dry solvent to remove unreacted base. A cyclic monomer could then be introduced, which would react with the surface sites, see below:

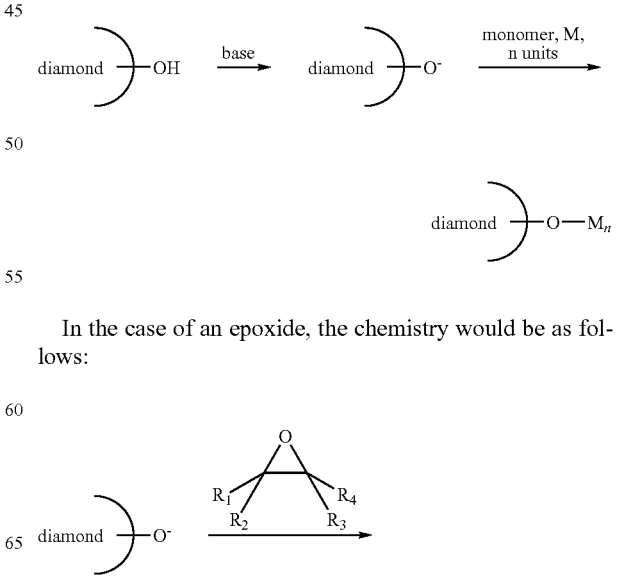

In the case of an epoxide, the chemistry would be as follows:

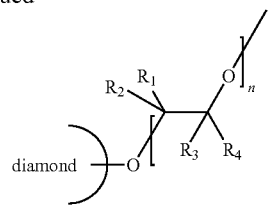

In the above reaction schemes, R1, R2, R3, and R4 could be different radicals, including hydrogen. Of course, there will be a cation paired with the O⁻ at the diamond surface. This cation itself could be ligated to one or more ligands.

Note that the epoxide could be chiral, and give chirality to the coating it forms.

Below is an example of ring opening polymerization from an O⁻ group at a diamond surface using a cyclic ester.

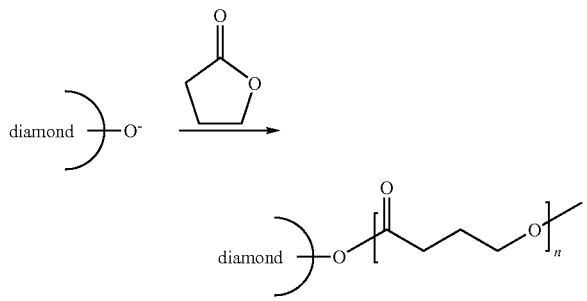

Many heterocyclic compounds can be polymerized by ring opening under certain conditions with ionic initiators, to produce linear macromolecules. Amongst these are cyclic ethers, cyclic sulfides, cyclic acetals, cyclic esters (lactones), cyclic amides (lactams), and cyclic amines. Ring opening polymerizations are carried out under similar conditions, and frequently with similar initiators to those used for ionic polymerizations of unsaturated monomers.

The ring-opening polymerization of cyclic ethers having 3-, 4-, and 5-membered rings (e.g., epoxides, oxetanes, THF) yields polymeric ethers.

Epoxides such as epoxyethane (ethylene oxide) can be polymerized cationically (e.g., with Lewis acids) and anionically (e.g., with alcoholates or organometallic compounds). Polymers of propylene oxide and generally substituted ethylene oxides can be produced in both atactic amorphous and isotactic crystalline forms. Optically active poly(propylene oxide)s can be obtained from chiral propylene oxide.

Polymerization of four-membered cyclic ethers (oxetanes) is also brought about by cationic initiators (e.g., Lewis acids) and by anionic initiators (e.g., organometallic compounds).

Like THF, cyclic acetals (e.g., 1,3-dioxolane and 1,3,5-trioxane) are polymerizable only with cationic initiators.

Cyclic esters of omega-hydroxycarboxylic acids can be polymerized by ring-opening to give linear aliphatic polyesters.

Some specific monomers that could be polymerized by ring opening methods from either an anionic or a cationic initiator on diamond are L-lactide, D-lactide, meso-lactide, glycolide, methylglycolide, epsilon-caprolactone, delta-valerolactone, gamma-butyrolactone, epichlorohydrin, 2-pyrrolidinone, 2-azetidinone, delta-valerolactam (2-piperidinone), cyclohexene oxide, exo-2,3-epoxynorbornane, 7-oxabicyclo[4.1.0]heptan-2-one, 4-vinyl-1-cyclohexene 1,2-epoxide, 6-acetoxy-3-oxatriclyclo-(3,2,1,0 2,4)-octane, trimethoxy[2-(7-oxabicyclo[4.1.0]hept-3-yl)ethyl]silane, (R)-(+)-1,2-epoxybutane, (S)-(−)-1,2-epoxybutane, cyclopentene oxide, 1,2-epoxypentane, 1,2-epoxy-5-hexene, (R)-(+)-1,2-epoxyhexane, (S)-4-chloro-1,2-epoxybutane, 1,2-epoxyoctane, 1,2-epoxydodecane, 1,2-epoxyoctadecane, 1,2-epoxyeicosane, (S)-(−)-1,2-epoxyoctane.

Note that carbon dioxide can be incorporated into some of these living polymers.

Note that a diepoxide or a triepoxide could be used as a crosslinking agent, e.g., vinylcyclohexene dioxide, dicyclopentadiene dioxide (mixture of endo and exo isomers), 1,3-butadiene diepoxide.

Introducing —OH Groups on the Diamond Surface

Figure 8:
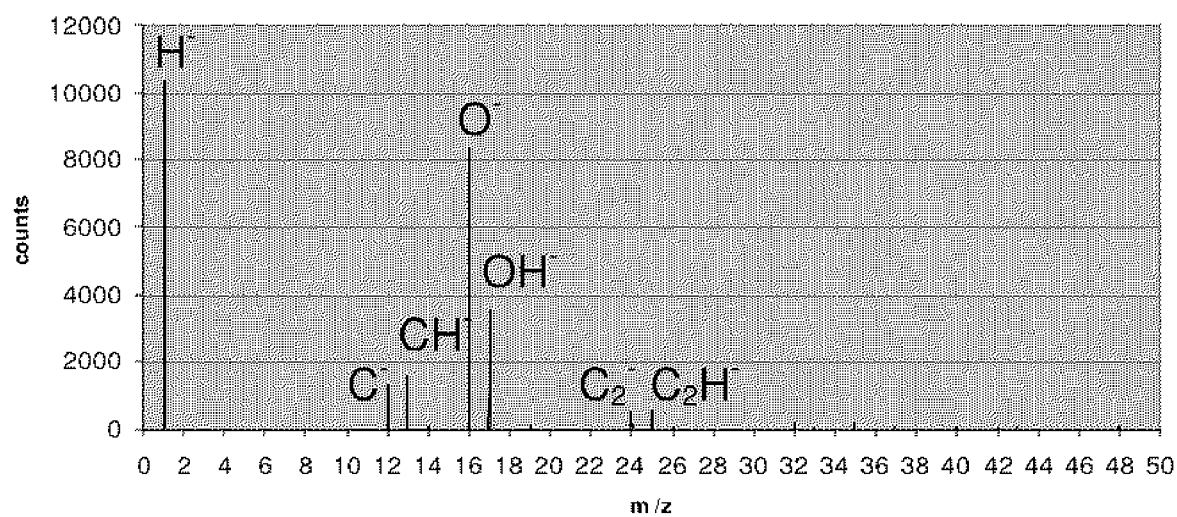
FIG. 8 is a SIMS spectrum of Piranha cleaned diamond.
Figure 9:
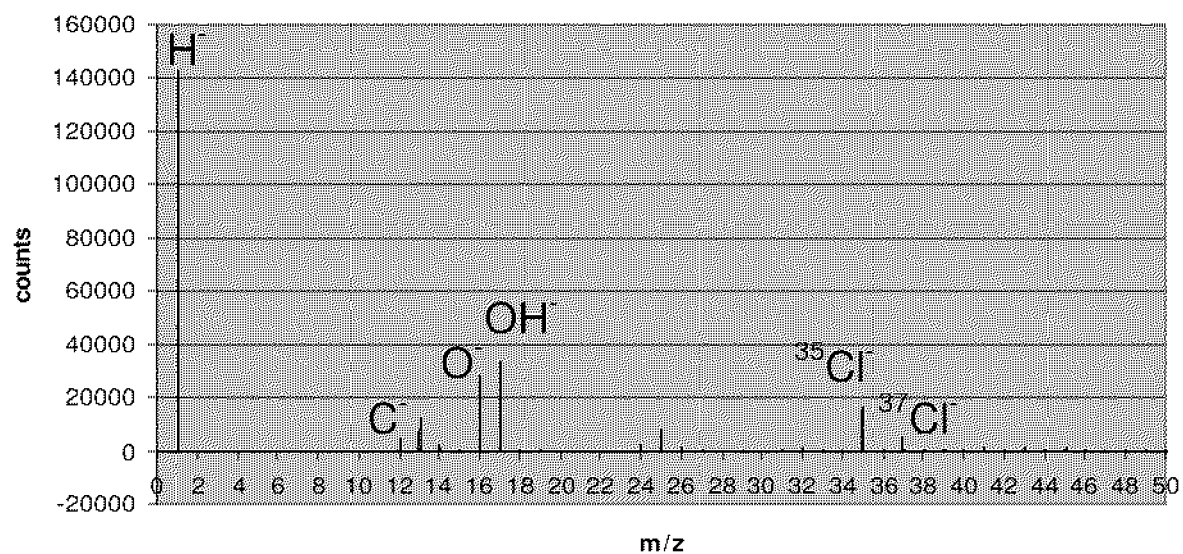
FIG. 9 is a SIMS spectrum of LAH treated diamond.
Figure 10:
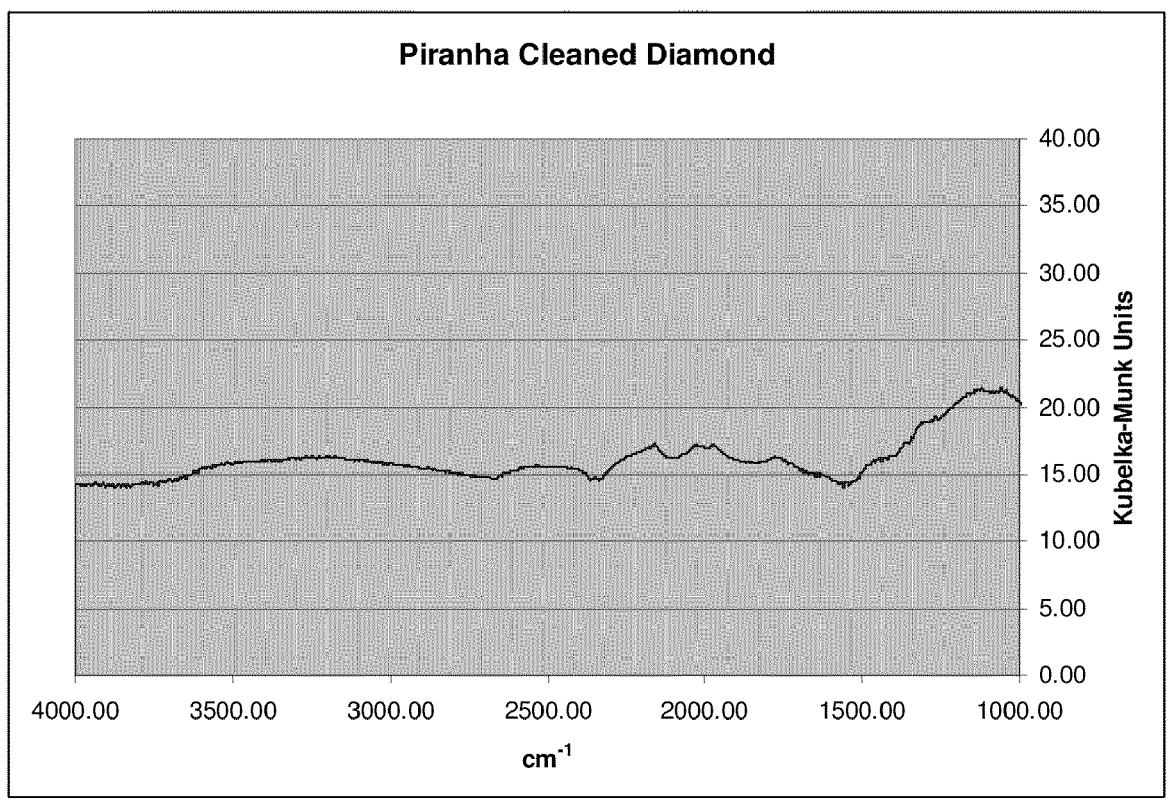
FIG. 10 is a DRIFT spectrum of Piranha cleaned diamond.

A method for introducing —OH groups to a diamond surface is by treatment with $LiAlH_4$. Diamond treated with $LiAlH_4$ has an increased density of hydroxyl groups. These hydroxyl groups can then be reacted with monomer to form living polymers on the diamond surface. Due to the higher density of hydroxyl groups, the polymer growth will also be denser. The evidence of this actually working is seen by reference to FIGS. 8 to 10.

Figure 7:
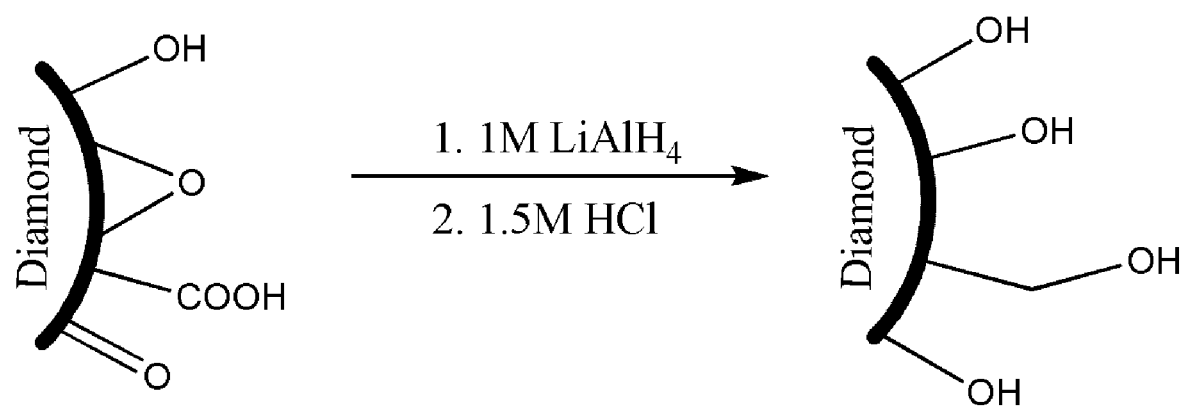
FIG. 7 shows Scheme for $LiAlH_4$ treatment of diamond to increase number of hydroxyl groups on the surface of the diamond. Piranha cleaned diamond is allowed to react with 1M $LiAlH_4$ in THF for 24-68 h. at room temperature.

With reference to FIG. 7, the reaction is as follows. The piranha solution ($H_2SO_4$ and $H_2O_2$) treated diamond is placed in a vessel, which is subsequently flushed with an inert atmosphere. $LiAlH_4$ (1M $LiAlH_4$ in tetrahydrofuran (THF)) is then added to the diamond through a septum via syringe. The reaction is then allowed to occur for 24-68 h, with occasional swirling. The result is a increased number of hydroxyl groups on the surface.

Figure 11:
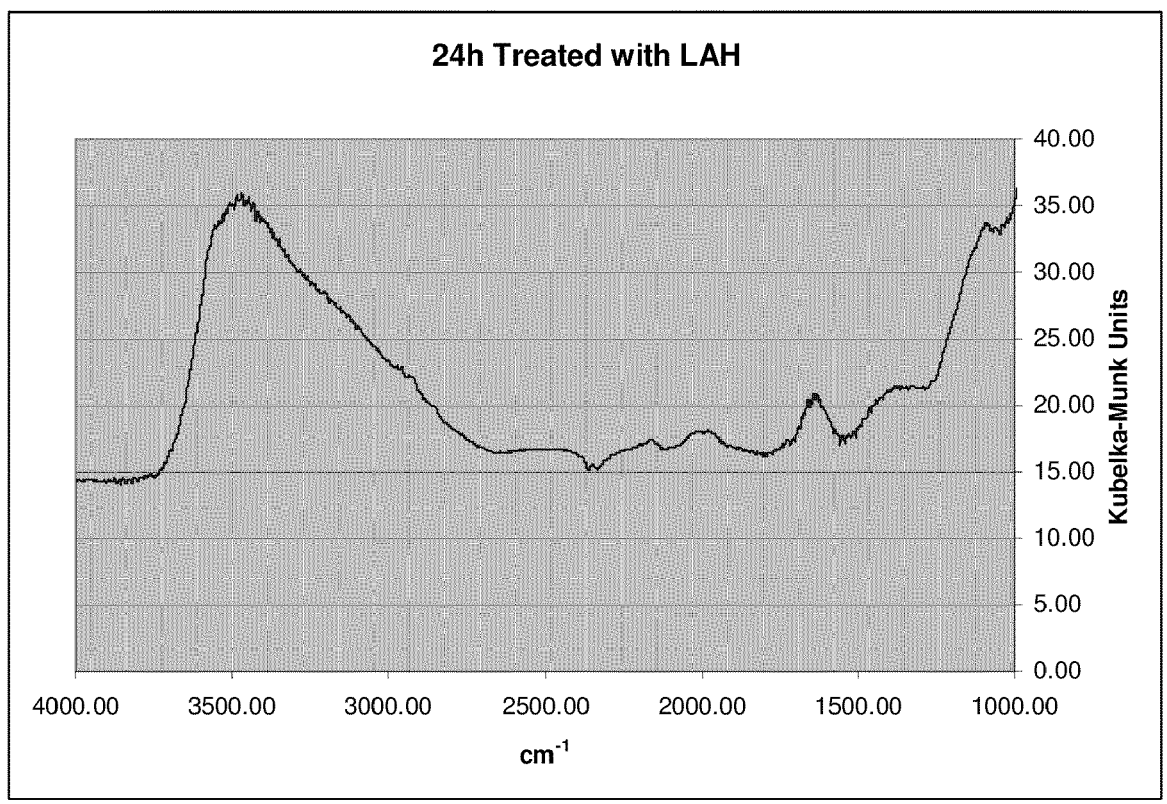
FIG. 11 is a DRIFT spectrum of diamond reacted with LAH for 24 h. Diamond size 1.7 μm.
Figure 12:
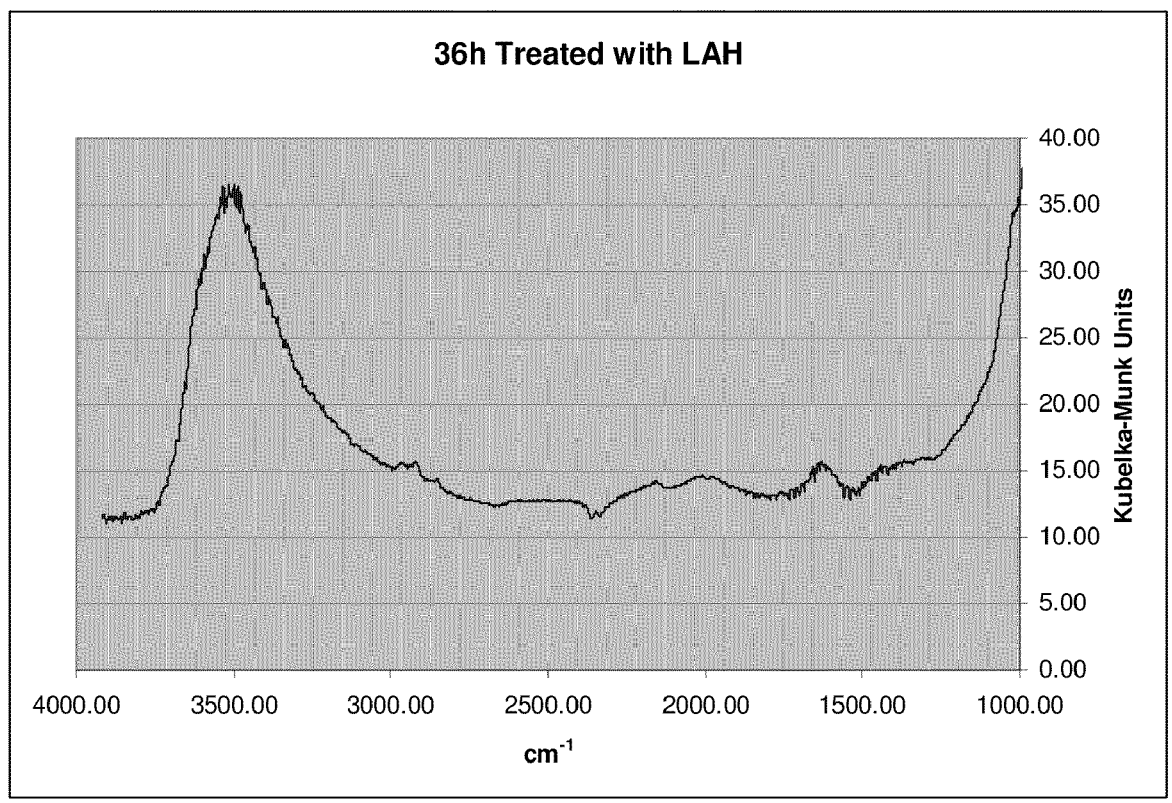
FIG. 12 is a DRIFT spectrum of diamond reacted with LAH for 36 h. Diamond size 1.7 μm.
Figure 13:
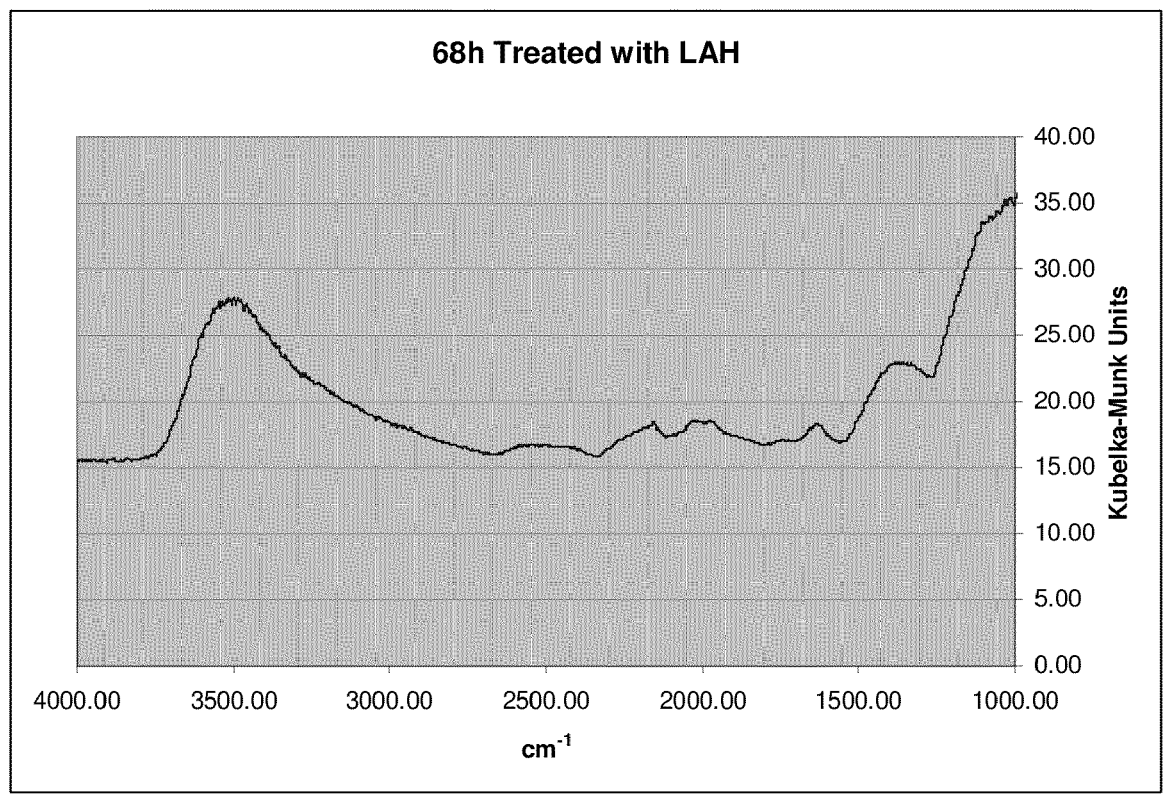
FIG. 13 is a DRIFT spectrum of diamond reacted with LAH for 68 h. Diamond size 5 μm.

The peaks seen at 3500 cm$^{-1}$ in the DRIFT spectra in FIGS. 11 to 13 are indicative of an increased amount of OH groups on the surface. The SIMS spectra in FIGS. 8 to 10 also show an increased amount of hydrogen on the surface, which would be consistent with more OH groups on the diamond surface.

Example I

Direct Polymer Attachment and Growth on Deuterium/Hydrogen-Terminated Diamond Substrates with Atom Transfer Radical Polymerization and Solid Phase Extraction on the Resulting Sorbents Atom transfer radical polymerization (ATRP) is applied to grow polymers on diamond surfaces. Before ATRP, the ATRP initiator should be introduced. There are two ways to immobilize the ATRP initiators. One method is putting the hydrogen- or deuterium-terminated diamond in bromine under light. The other method is reacting piranha cleaned diamond with 2-bromoisobutyryl bromide. Polystyrene (PS) or crosslinked polystyrene can be grown on the diamond powders by ATRP. These phases have excellent stability in both highly acidic and highly basic media. Thicker polymer layers are obtained when a crosslinking agent, such as divinylbenzene is employed as part of the monomer mixture. Sulfonation of these phenyl phases is demonstrated with a $H_2SO_4$/$CH_3COOH$ mixture. Solid phase extraction is performed on the resulting strong cation exchange material using 1-aminonaphthalene.

Experimental Section

Reagents

All chemicals were used as received, except that all monomers were passed through an inhibitor removing column prior to use, as follows: tetrahydrofuran (Aldrich, spectra grade); styrene (Spectrum, 99%, inhibited with 50 ppm p-tert-butylcatechol); divinylbenzene (DVB) (Aldrich, 80%, remainder mostly 3- and 4-ethyl vinyl benzene, inhibited with 1000 ppm p-tert-butylcatechol).

All monomers were passed through an inhibitor-removing column to remove polymerization inhibitors prior to use. The adsorbants for removing MEHQ and tert-butylcatechol were obtained from Aldrich.

The mixture gases including 5% deuterium/hydrogen in argon (99.999% pure) were purchased from Airgas Inc. Commercial diamond powder was provided by USSythetic. The average diameter is 70 μm.

Preparation of Deuterium/Hydrogen-Terminated Diamond Powder.

Diamond powder was used as substrate. The diamond powder was treated in flowing 5% $D_2$ or $H_2$ (in Ar) gas at 900° C. for 28 hours. 5% deuterium or hydrogen (in Ar) is not a flammable mixture, and therefore much safer to work with than pure $D_2$ or $H_2$ gas. The Mini-Mite Tube Furnace of Lindberg/Blue M (model number is TF55030A-1) was purchased from the Thermo Electron Corporation. During the reaction, the diamond powder was shaken twice to evenly deuterate the surface and it was then cooled in flowing 5% $D_2$ or $H_2$ (in Ar). After this treatment, the diamond powder was terminated with deuterium or hydrogen. The resulting deuterium/hydrogen-terminated diamond powder was used as a starting material.

Introduction Initiators by Two Methods

There are two ways to immobilize the ATRP initiators. One method is putting the hydrogen- or deuterium-terminated diamond in bromine under light to introduce the initiator. The light wavelength range could be 250-600 nm.

The other way, the diamond powder was cleaned in piranha solution (70% $H_2SO_4$:30% conc. $H_2O_2$) at 100° C. for 1 h, and then thoroughly washed with deionized water. Clean, untreated diamond powder was slurried in a dry THF solution containing 0.5M 2-bromoisobutyryl bromide and 0.55 M pyridine. After 24 h, diamond powder was washed thoroughly with methanol and deionized water.

Polymerization on the Diamond Powder

Diamond particles containing initiator (3 g) and CuBr (0.26 g) were placed in a flask and degassed with nitrogen. Subsequently, degassed 2,2'-bipyridine (bipy) (0.58 g) in 10.0 g styrene (or 4 g styrene and 6 g divinylbenzene) and 10 mL 1,4-dioxane was mixed with it. The mixture was stirred with a magnetic stir bar, heated to 110° C. under nitrogen, and the reaction continued for 19 h. The particles were washed and sonicated with THF and methanol/glacial acetic acid (95/5) until the solvent was colorless.

Sulfonation of Polystyrene Functionalized Diamond Powder

The method of PS-DVB resin sulfonation described by Dumont and Fritz was followed. 2 g polystyrene or polystyrene-divinylbenzene (PS-DVB) functionalized diamond powder was slurried in 5 mL acetic acid followed by 50 mL concentrated sulfuric acid in an ice bath. Then the reaction was set at 90° C. for 5 hours and finally poured over ice to quench the reaction. The diamond powder was filtered and washed with water until the pH of water was neutral.

Stability Studies Approximately 1.0 M NaOH and 1.0 M HCl solutions were prepared for pH stability studies. 0.2 g of each adsorbent was immersed separately in either the NaOH or HCl solution for 72 h. Finally, the particles were captured on a filter funnel as before (vide supra) and rinsed with copious quantities of Millipore water.

Characterization of the Diamond Surfaces

Time-of-flight secondary ion mass spectrometry (ToF-SIMS) was performed with an ION-TOF ToF-SIMS IV instrument using monoisotopic 25 keV $^{69}Ga^+$ ions. X-ray photoelectron spectroscopy was performed with an SSX-100 X-ray photoelectron spectrometer with a monochromatic Al $K_\alpha$ source and a hemispherical analyzer. An electron flood gun was employed for charge compensation. Survey scans as well as narrow scans were recorded with an 800×800 μm spot. The diamond surface was characterized by a Magna-IR 560 spectrometer from Nicolet (Madison, Wis.). The DRIFT spectra were obtained over the range of 4000-400 $cm^{-1}$. For each spectrum, 64 scans were collected at a resolution of 4 $cm^{-1}$. The diffuse reflectance was converted into Kubelka-Munk function units.

Solid Phase Extraction (SPE)

SPE of 1-naphthylamine was performed with packings prepared in our laboratory. For our experiments, the material in a commercially available cartridge was replaced by our sulfonated stationary phase. A control experiment was performed that showed that neither the plastic cartridge nor the frits retained analytes. The same volume of packing material was used in all of our experiments. To improve packing, the cartridges were washed with water and pumped on with the house vacuum during loading. Finally, the columns were dried using the house vacuum.

Prior to SPE, cartridges containing our sulfonated polystyrene diamond phase were first conditioned with 6 column volumes of methanol, and then with six column volumes of phosphate buffer (10 mM, pH=1.9). 50 μL of 1-naphthylamine (1 mg/mL) in phosphate buffer (10 mM, pH=1.9) was loaded into the column. This analyte was used to test sulfonation of polystyrene coated diamond. In this procedure, the analyte is not eluted with phosphate buffer (10 mM, pH=1.9), but eluted with phosphate buffer (10 mM, pH=1.9, NaCl, ionic strength 0.2M) and methanol (The ratio is 1:1).

In practice, sulfonated polystyrene modified diamond SPE adsorbents could be repeatedly used without noticeable degradation. After each reuse, the column was washed with phosphate buffer (10 mM, pH=1.9, NaCl, ionic strength 0.2M) several times to regenerate the cation exchange column.

Breakthrough Curves

The analyte used for determination of breakthrough volumes was 1-naphthylamine. The column was first conditioned using the procedures mentioned above. After conditioning, the analyte solution (0.02 mg/mL) was loaded onto the cartridge. The column was kept wet, and the flow rate was kept constant during the process. Equal volumes of the fractions eluting from the column were collected in separate vials. Finally, ESI-MS was done to analyze these fractions.

Breakthrough curves had sigmoidal shapes. The breakthrough volume was calculated from the point on the curve corresponding to 5% of the average value at the maximum (plateau region).

Electrospray MS (ESI-MS)

Electrospray MS (ESI-MS) was performed on an Agilent Technologies LC/MSD TOF system by direct infusion of several μLs of sample along with the mobile phase: 75% MeOH and 25% water with 5 mM ammonium formate. In positive ion mode, the charging voltage and the capillary voltage were set at 900 V and 3500 V, respectively, and the skimmer was operated at 60 V. The nebulizer was at 35 psi and the gas temperature was 350° C. The flow rate of the nitrogen drying gas was set at 12 L/min. All of the instrument parameters in negative ion mode were identical to those in positive ion mode, except the capillary voltage and drying gas flow rate, which were set at 4000 V and 8 L/min, respectively.

Stability Test

Sulfonated polystyrene coated diamond was immersed in 1M NaOH and 1M HCl solution for 72 hours respectively to test the stability in strong base or strong acid. XPS, TOF-SIMS and IR were used to characterize these diamond powders.

Results and Discussion

1. Polymerization and Sulfonation on the Diamond Powder by ATRP

Before atom transfer radical polymerization, an ATRP initiator should be introduced. Two methods can be used. One is by photoreaction, the other one is addition of 2-bromoisobutyryl bromide, performed according to the procedure of Carlmark and Malmstrom. Then these brominated diamond powder react with styrene or styrene/DVB, Cu(I) Br and bipyridine at 110° C. Finally polystyrene or polystyrene-divinylbenzene functionalized diamond powders are sulfonated. The whole procedure (Scheme 1) is shown below.

Scheme 1: ATRP from surface of particle initiators.

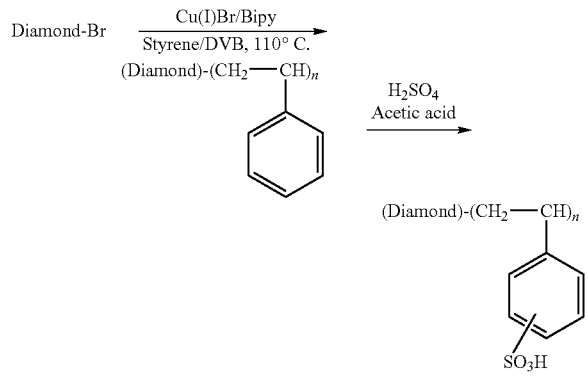

An obvious bromine signal is present in the X-ray photoelectron spectroscopy (XPS) survey spectrum of brominated diamond powder from deuterium-terminated diamond powder (See FIG. 1a) and brominated diamond powder from piranha cleaned diamond powder (See FIG. 1b). The diamond powder brominated with 2-bromoisobutyryl bromide showed a significant oxygen peak, compared with the diamond powder with photoreaction. The increased oxygen signal is consistent with the carbonyl group of 2-bromoisobutyryl bromide. The brominated diamond powder is then treated with styrene or styrene/DVB, Cu(I) Br and bipyridine at 110° C. XPS shows a significant reduction in the oxygen signal (See FIG. 1c) and the C/O ratio is increased. These results show that polystyrene has grown on the diamond surface since more carbon signal is introduced. Table 1 shows the compositions of all diamond surfaces.

In time of flight-secondary ion mass spectrometry (ToF-SIMS), after polymerization, there are numerous hydrocarbon peaks and the characteristic peaks are mostly the same as those peaks of standard polystyrene. The relative intensities of characteristic peaks matched the standard well. This is especially, true for the higher masses region for the main characteristic peaks such as 103, 105, 115, 117 and 128. This result shows that the brominated diamond is functionalized by polystyrene. In contrast, before polymerization, characteristic peaks such as 103, 105, 115, 117 and 128 do not match with standard polystyrene positive ToF-SIMS spectra.

Figure 2:
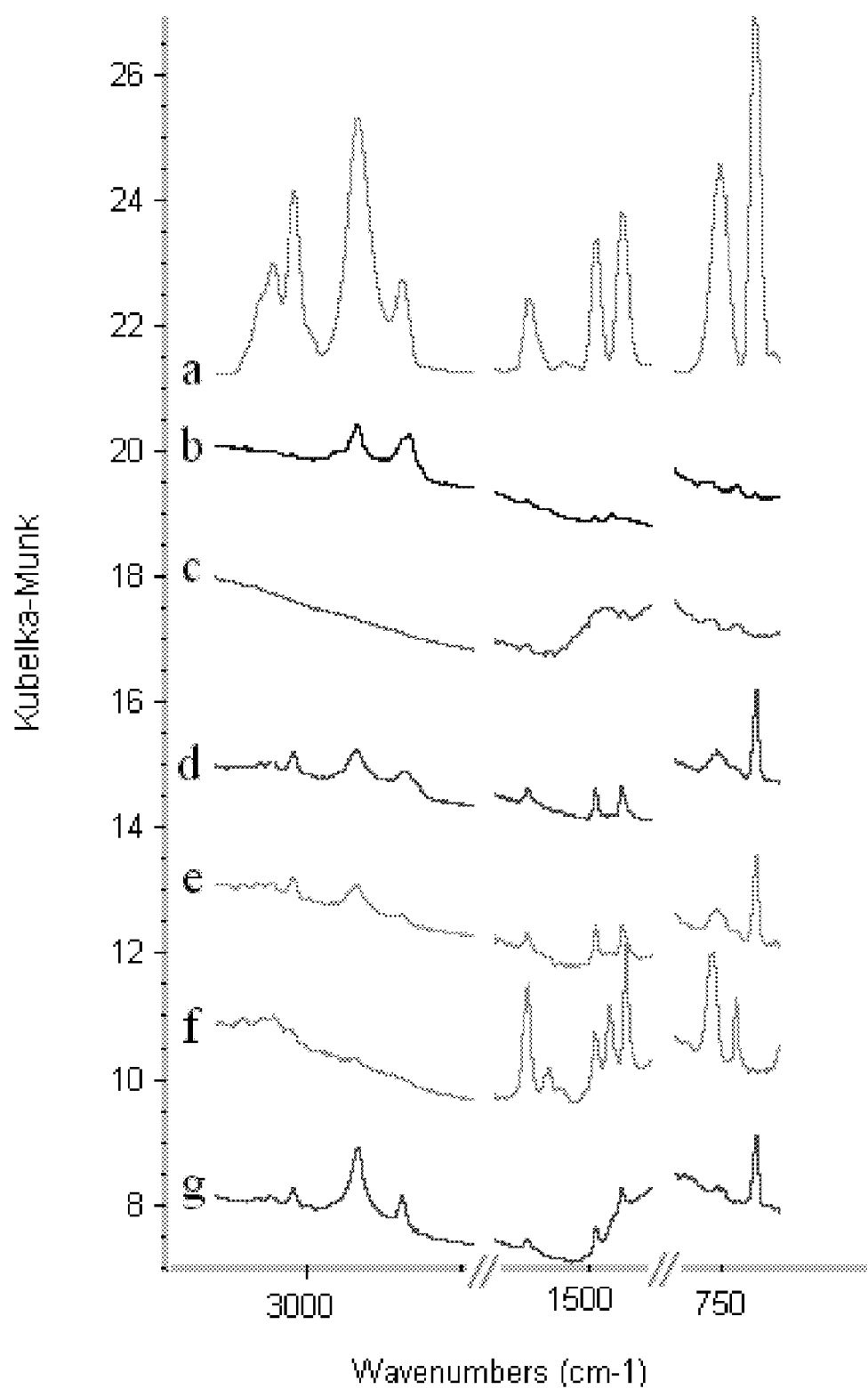
FIG. 2 shows DRIFT-IR for diamond powders: a) infrared spectrum of neat polystyrene, b) hydrogen-terminated diamond, c) piranha-treated diamond, d) polystyrene functionalized diamond obtained by photoreaction and ATRP, e) polystyrene functionalized diamond obtained by reaction with 2-bromoisobutyryl bromide and ATRP, f) polystyrene-DVB functionalized diamond obtained by 2-bromoisobutyryl bromide and ATRP and g) polystyrene functionalized diamond obtained by di-tert-amyl peroxide and styrene.
Figure 4:
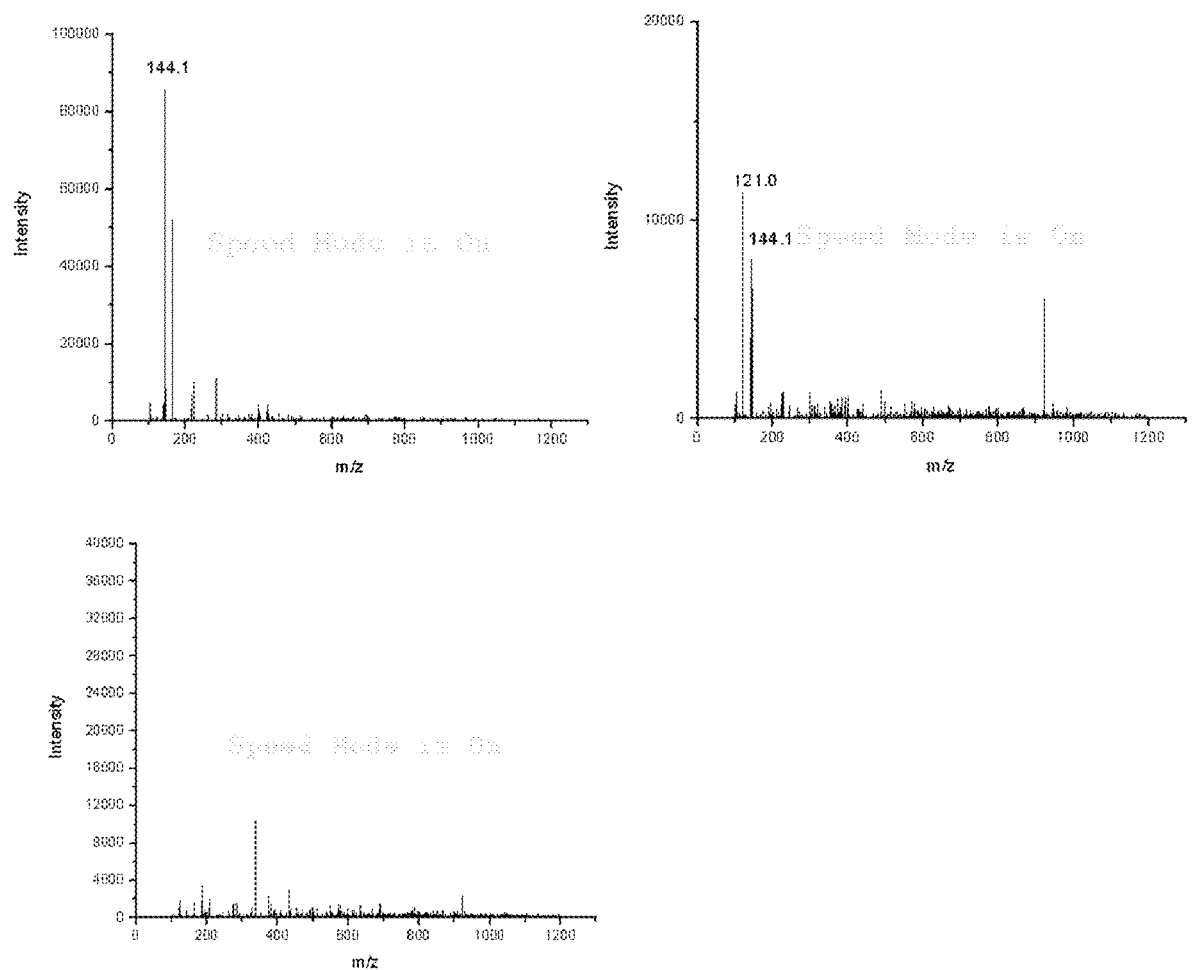
FIG. 4 shows electrospray ionization mass spectra of three fractions by eluting the column with buffer (pH=1.9, NaCl, ionic strength 0.2M) and methanol (The ratio is 1:1).

Regardless of how the surface was brominated, the infrared spectrum of the diamond after ATRP showed the C—H stretching peaks of aromatic rings (3000-3200 $cm^{-1}$) and alkyl chains (2800-3000 $cm^{-1}$) (See FIGS. 2d, e and f). In addition, the standard IR spectrum of polystyrene (See FIG. 2a) is compared with the spectrum of the diamond powder functionalized by polystyrene. Most of the other peaks matched very well, such as the monobenzene peak at 700 $cm^{-1}$ and the other characteristic peaks at 1450 $cm^{-1}$, 1500 $cm^{-1}$ and 1600 $cm^{-1}$ (See FIGS. 4a, d, e and f), which are assigned as combined ring vibrations. Two controls were also performed. They are deuterium-terminated diamond powder and piranha solution cleaned diamond powder which did not have not the ATRP initiators. There were allowed to react with styrene, Cu(I) Br and bipyridine at 110° C. FIGS. 2b and c showed no C—H stretching peaks of aromatic rings (3000-3200 $cm^{-1}$). In addition, the other characteristic peaks of polystyrene at 1450 $cm^{-1}$, 1500 $cm^{-1}$ and 1600 $cm^{-1}$ were not present.

This evidence suggests that our functionalization is successful. During this reaction, styrene (or adding cross linker DVB) can be polymerized on the diamond surfaces.

Polystyrene (PS) or polystyrene-divinylbenzene (PS-DVB) functionalized diamond powder was slurried in 5 mL acetic acid followed by 50 mL concentrated sulfuric acid in an ice bath. Then the reaction temperature was raised to 90° C. for 5 hours and finally the PS or PS-DVB was sulfonated. XPS shows an obvious sulfur signal (See FIG. 1d), which was not present before the sulfonation. The composition of this diamond surface is shown in Table 1.

TABLE 1

The compositions for the surfaces of diamond powders

| | C | O | Br | S |
|---|---|---|---|---|
| D-Br | 90.2 | 8.8 | 1.0 | |
| Isobromide | 77.1 | 22.5 | 0.4 | |
| PS | 88.0 | 12.0 | | |
| PS-sulfonation | 82.5 | 15.7 | | 1.8 |

Chemical stability tests were performed by immersing sulfonated polystyrene coated diamond particles into 1.0 M HCl or 1.0 M NaOH for 70 h. Following this treatment, approximately one-tenth and one-third of the sulfur was removed from the surface; after exposures to acid and base, respectively. These results were compared to the stability of a commercially available SPE stationary phase (Phenomenex Strata SCX, 55 µM, 70 Å). Prior to stability tests, the S2p-to-C1s ratio by XPS was 0.16±0.03. After immersion of these particles in 1.0 M NaOH for 8 h, the particles completely dissolved. To further verify the dissolution of these particles, the resulting clear solution was filtered. It easily passed through the filter, leaving no material behind. The Phenomenex particles were also immersed in 1 M HCl for 70 h. A small decrease in the S2p/C1s ratio was observed (down to 0.15±0.02), which suggests that 6% of the sulfur-containing coating on the particles had been lost. Thus, the deposited PS-sulfonated coatings on diamond have almost the same stability in acid as a commercially available SCX SPE packing material, while being much more stable to base.

2. Strong Cation Exchange SPE Procedure and Breakthrough Curve

Figure 3:
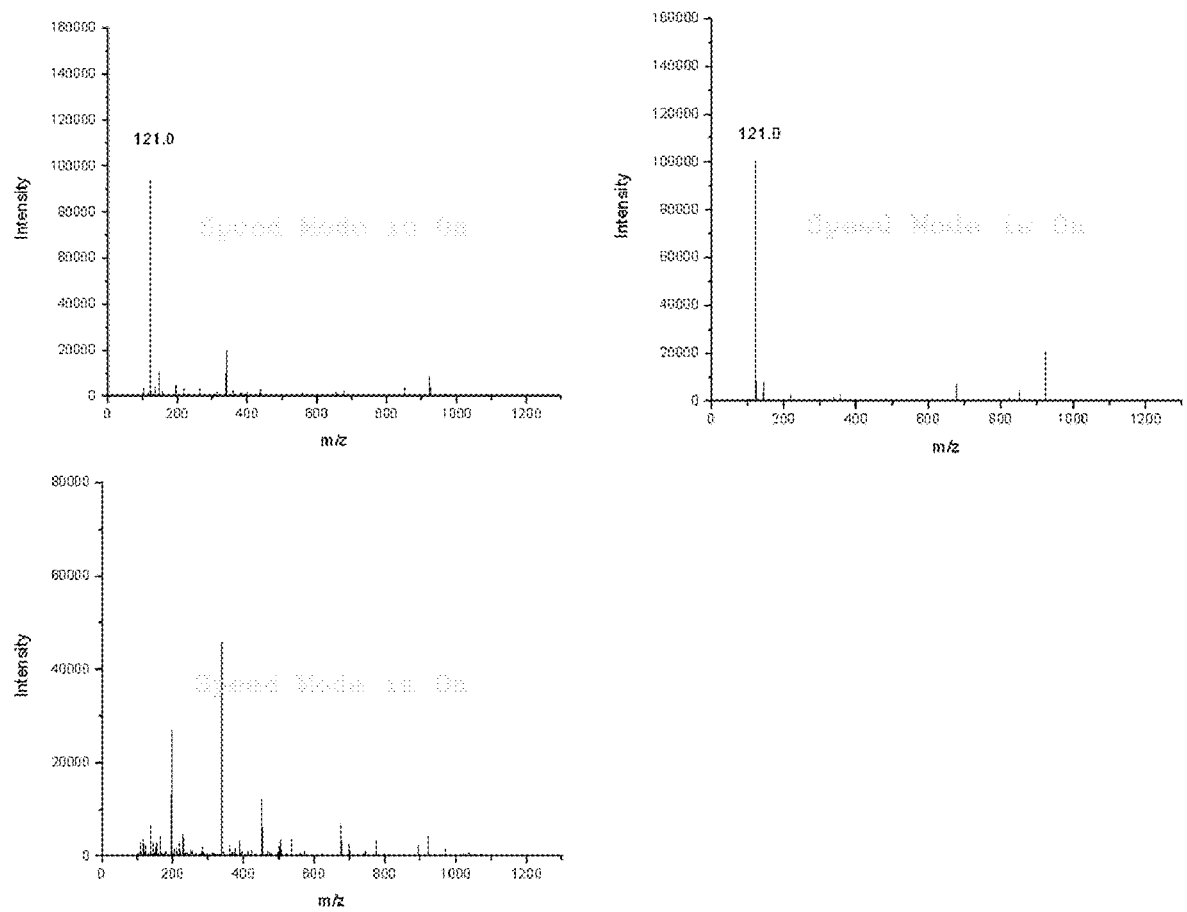
FIG. 3 shows electrospray ionization mass spectra of three fractions by washing the column with buffer (pH=1.9).

These sulfonated PS diamond powders were packed into a strong cation exchange SPE column. The column was conditioned with 6 column volumes of methanol followed by 6 column volumes phosphate buffer ($H_3PO_4$ and $NaH_2PO_4$, pH=1.9). The analyte used to test the SPE columns was 1-naphthylamine. 1-naphthylamine (molecular weight: 143.1) was loaded into the column by depositing a 50 µL sample of 1-naphthylamine dissolved in buffer (pH=1.9) (1 mg/mL). Then 3 column volumes of the same buffer were used for washing the column and the analyte did not elute (See FIG. 3) because it was retained by the column. Finally, the analyte was eluted by the same buffer but mixed with sodium chloride (pH=1.9, ionic strength is 0.2M) and methanol (The ratio is 1:1) (See FIG. 4). All the fractions from the SPE column were analyzed by electrospray ionization mass spectroscopy. (Note: Peak 121.0 is a reference peak. Peak 164.1 might be from the matrix. Peak 144.1 is the [M+H]$^+$ of the analyte.)

Figure 5:
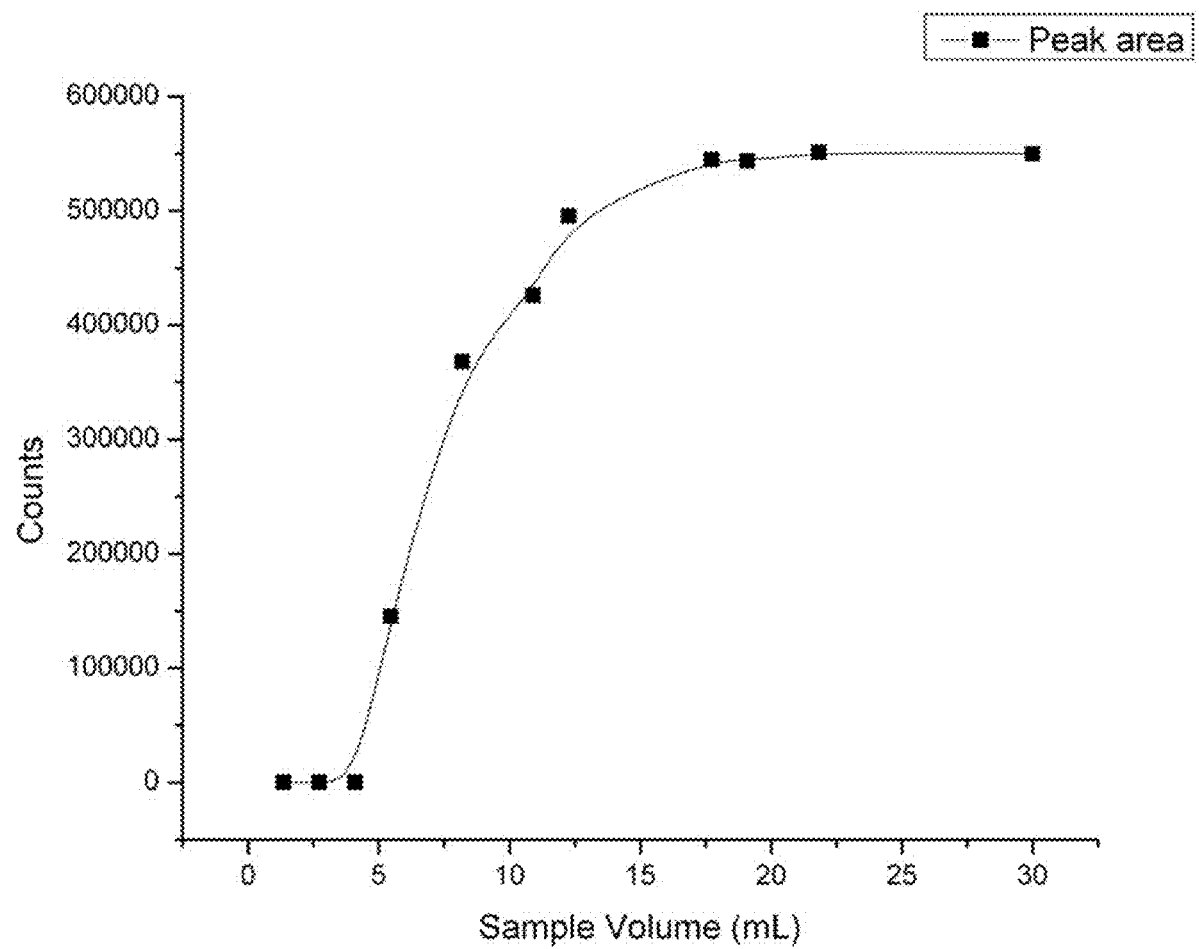
FIG. 5 shows a breakthrough curve of SCX SPE column. Each point represents the peak area of the analyte from the positive ESI-MS spectra.
Figure 6:
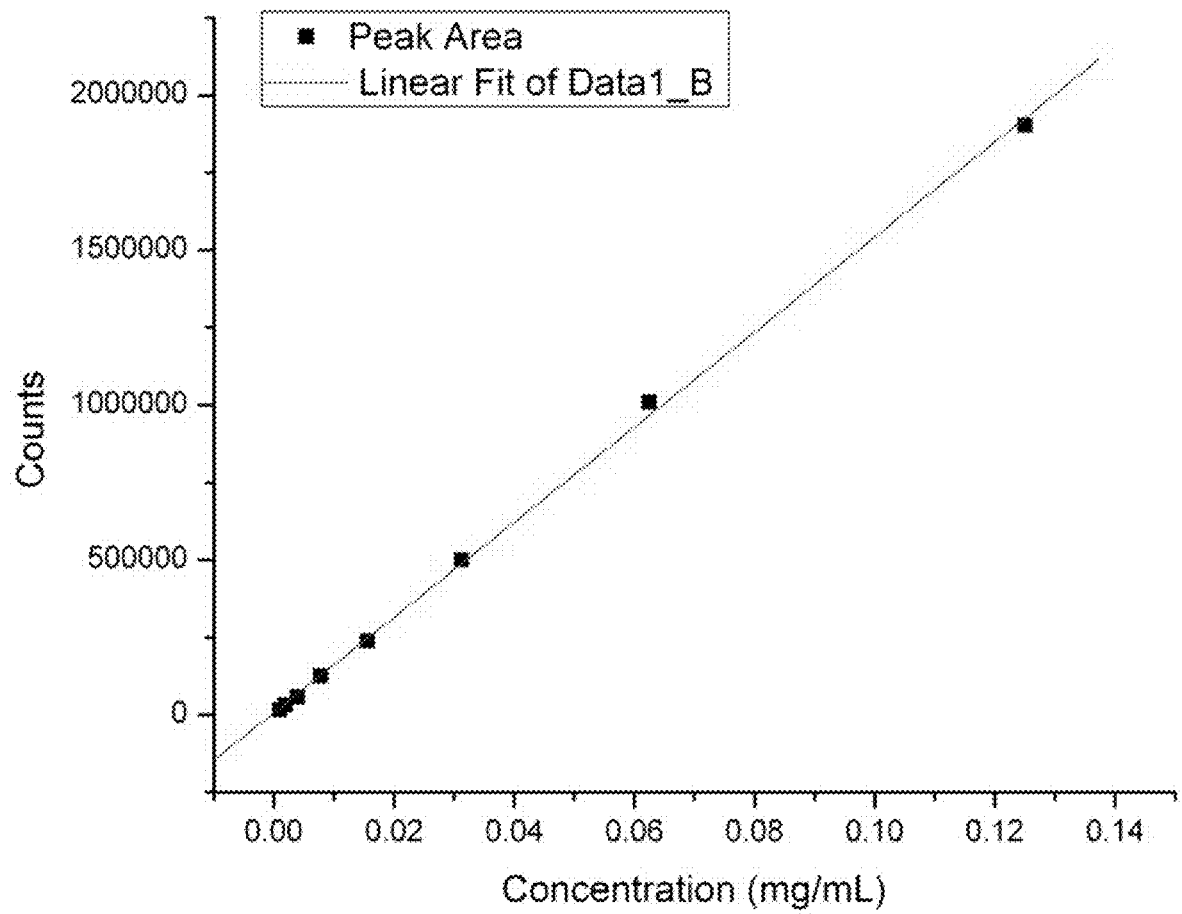
FIG. 6 shows the dynamic range of the phosphate buffer (pH=1.9) solution of 1-naphythamine in ESI-MS.

Breakthrough curves were obtained for the SPE column using 1-naphthylamine as an analyte for determination of breakthrough volumes of the cation exchange SPE column. The columns were conditioned with 6 column volumes of methanol followed by 6 column volumes phosphate buffer ($H_3PO_4$ and $NaH_2PO_4$, pH=1.9). The solution of 1-naphthylamine dissolved in buffer (pH=1.9) (0.02 mg/mL) was allowed to flow through the column at a constant flow rate while the breakthrough curves were being obtained. Equal volumes of the fractions eluting from the column were collected in separate vials. The samples were then analyzed using electrospray ionization mass spectrometry to obtain the breakthrough curves based on the presence of 1-naphthylamine in the collected fractions. The breakthrough curve is shown in FIG. 5. The breakthrough volume was taken from the point on the breakthrough curve corresponding to 5% of the average value at the maximum (i.e., the breakthrough curve plateau region). From these breakthrough curves, a column capacity for cation exchange SPE column was found to be 0.087 mg. FIG. 6 is the dynamic range of the solution of 1-naphythamine in ESI-MS. This linear relationship demonstrates the breakthrough curve is under this range and the plateau region of the breakthrough curve is the saturation of the SCX SPE column, not the saturation of the ESI-MS detector.

References to other publications and patents have been made in this disclosure, all of which are incorporated herein by reference.

What is claimed is:

1. A method for coating a diamond surface comprising:
providing surface initiation sites on the diamond surface for initiation of a living polymerization on the site;
reacting the surface initiation sites with a monomer having a site that reacts with and bonds to an initiation site to form an chemically attached chain with a new initiation site on the chain for further reaction with a monomer, the surface initiation site being carbon-carbon double bond, and the reacting the surface initiation site comprising ring opening metathesis polymerization.

2. A method for coating a diamond surface comprising:
providing surface initiation sites on the diamond surface for initiation of a living polymerization on the site;
reacting the surface initiation sites with a monomer having a site that reacts with and bonds to an initiation site to form an chemically attached chain with a new initiation site on the chain for further reaction with a monomer, the surface initiation site being —O$^-$ and the reacting the surface initiation site comprising epoxide ring opening reactions.

3. A method for coating a diamond surface comprising:
providing surface initiation sites on the diamond surface for initiation of a living polymerization on the site;
reacting the surface initiation sites with a monomer having a site that reacts with and bonds to an initiation site to form an chemically attached chain with a new initiation site on the chain for further reaction with a monomer, the diamond surface first treated with $LiAlH_4$ to increase the number of —OH sites and the surface initiation sites include the added —OH sites, where H is hydrogen or deuterium.

4. A method for producing a diamond with a coated surface comprising;
reacting —OH groups in the surface with 2-bromoisobutyryl bromide to produce bromide surface initiation sites on the surface;
reacting the surface initiation sites with a monomer reactive with the surface initiation sites under an atom transfer radical polymerization reaction system.

5. A method as in claim 4 wherein the coated surface comprises polystyrene.

6. A method for producing a diamond with a coated surface comprising;
reacting the diamond surface to form —H groups on the surface, where H is hydrogen or deuterium,
reacting the —H groups with $Br_2$ to produce bromide surface initiation sites on the surface,
reacting the surface initiation sites with a monomer reactive with the surface initiation sites under an atom transfer radical polymerization reaction system.

7. A method for producing a diamond with a coated surface comprising;
deprotonating —OH groups on the diamond surface to form —O$^-$ initiation sites on the surface,
reacting the surface initiation sites with a monomer having a site that reacts with and bonds to the initiation site to form an chemically attached chain with a new initiation site on the chain for further reaction with a monomer.

8. The method of claim 7 wherein the monomer is an epoxide.

9. A method as in claim 6 wherein the monomer contains a group or groups that impart activity to the coating.

10. A method as in claim 9 wherein the monomer contains one or more of aromatic groups, hydroxyl, carboxyl, amine, primary, secondary, tertiary, or quaternary amine groups, carboxyl groups, hydroxyl groups, sulfonic acid groups, cyano groups, alkyl chains.

11. An article comprising a coating upon a diamond surface, the coating the reaction product of a living polymerization reaction with surface initiation sites on the diamond surface where the living polymerization reaction comprises reacting the surface initiation sites with a monomer having a site the reacts with and bonds to an initiation site to form an chemically attached chain with a new initiation site on the chain for further reaction with a monomer, the surface initiation site being carbon-carbon double bond, and
the reacting the surface initiation sites comprising ring opening metathesis polymerization.

12. An article as in claim 11 wherein the coating imparts to the diamond surface an activity derived from group or groups contained in the monomer.

13. An article as in claim 12 the monomer contains one or more of aromatic groups, hydroxyl, carboxyl, amine, primary, secondary, tertiary, or quaternary amine groups, carboxyl groups, hydroxyl groups, sulfonic acid groups, cyano groups, alkyl chains.

14. An article comprising a coating upon a diamond surface, the coating the reaction product of a living polymerization reaction with surface initiation sites on the diamond surface where the living polymerization reaction comprises;
reacting the surface initiation sites with a monomer having a site the reacts with and bonds to an initiation site to form an chemically attached chain with a new initiation site on the chain for further reaction with a monomer, the surface initiation site being —O⁻ and the reacting the surface initiation site comprising epoxide ring opening reactions.

15. An article comprising a coating upon a diamond surface, the coating the reaction product of a living polymerization reaction with surface initiation sites on the diamond surface where the living polymerization reaction comprises;
reacting the surface initiation sites with a monomer having a site the reacts with and bonds to an initiation site to form an chemically attached chain with a new initiation site on the chain for further reaction with a monomer,
the diamond surface first treated with $LiAlH_4$ to increase the number of —OH sites and the surface initiation sites include the added —OH sites, where H is hydrogen or deuterium.

16. An article comprising a coating upon a diamond surface, the coating the reaction product of deprotonating —OH groups on the diamond surface to form —O⁻ initiation sites on the surface, and reacting the surface initiation sites with a monomer having a site that reacts with and bonds to the initiation site to form a chemically attached chain with a new initiation site on the chain for further reaction with a monomer.

17. An article as in claim 16 wherein the monomer is an epoxide.

18. An article as in claim 16 wherein the reacting the surface initiation sites includes epoxide ring opening reactions.

19. An article as in claim 16 wherein the coating imparts to the diamond surface an activity derived from group or groups contained in the monomer.

20. An article as in claim 16 the monomer contains one or more of aromatic groups, hydroxyl, carboxyl, amine, primary, secondary, tertiary, or quaternary amine groups, carboxyl groups, hydroxyl groups, sulfonic acid groups, cyano groups, alkyl chains.

* * * * *